United States Patent
Safariforoshani et al.

(10) Patent No.: US 11,466,552 B2
(45) Date of Patent: Oct. 11, 2022

(54) SYSTEMS AND METHODS TO INCREASE THE DURABILITY OF CARBONATE RESERVOIR ACIDIZING

(71) Applicant: Weatherford Technology Holdings, LLC, Houston, TX (US)

(72) Inventors: Mohammadreza Safariforoshani, Houston, TX (US); Francisco Fragachan, Al Khobar (SA)

(73) Assignee: Weatherford Technology Holdings, LLC, Houston, TX (US)

(*) Notice: Subject to any disclaimer, the term of this patent is extended or adjusted under 35 U.S.C. 154(b) by 0 days.

(21) Appl. No.: 17/287,014

(22) PCT Filed: Oct. 26, 2018

(86) PCT No.: PCT/US2018/057774
§ 371 (c)(1),
(2) Date: Apr. 20, 2021

(87) PCT Pub. No.: WO2020/086097
PCT Pub. Date: Apr. 30, 2020

(65) Prior Publication Data
US 2021/0332686 A1    Oct. 28, 2021

(51) Int. Cl.
*E21B 43/28* (2006.01)
*C09K 8/72* (2006.01)
*E21B 43/16* (2006.01)

(52) U.S. Cl.
CPC ............ *E21B 43/28* (2013.01); *C09K 8/72* (2013.01); *E21B 43/16* (2013.01)

(58) Field of Classification Search
CPC ............ E21B 43/16; E21B 43/28; C09K 8/72
See application file for complete search history.

(56) References Cited

U.S. PATENT DOCUMENTS

| | | | |
|---|---|---|---|
| 6,196,318 | B1 | 3/2001 | Gong et al. |
| 6,668,922 | B2 | 12/2003 | Ziauddin et al. |
| 7,165,613 | B2 | 1/2007 | Chan et al. |
| 7,561,998 | B2 | 7/2009 | Panga et al. |

(Continued)

FOREIGN PATENT DOCUMENTS

| | | |
|---|---|---|
| EP | 2192507 | 6/2010 |
| WO | 2016/014485 | 1/2016 |

OTHER PUBLICATIONS

Safari, Reza, et al., "Improved Recovery of Carbonate Reservoir by Optimizing Azidizing Strategy; Coupled Wellbore, Reservoir, and Geomechanical Analysis," Society of Petroleum Engineers, SPE-188683-MS, 2017, 16 pages.

(Continued)

*Primary Examiner* — Silvana C Runyan
(74) *Attorney, Agent, or Firm* — Lewis & Reese, PLLC

(57) ABSTRACT

Systems and methods for predicting and optimizing the effects of acidizing treatment of carbonate rock are disclosed. The disclosed methods predict the conflicting effects of increased production (i.e., wormhole creation) and reduced rock compressive strength due to acid rock reactions. The mechanical stability of stimulated wellbores, such as horizontal wellbores, can be determined under different acidizing conditions, such as acid type and volume. The acidizing conditions can be optimized to maximize short and long-term production.

20 Claims, 5 Drawing Sheets

(56) References Cited

U.S. PATENT DOCUMENTS

| | | | |
|---|---|---|---|
| 7,603,261 B2 | 10/2009 | Tardy | |
| 7,657,415 B2 | 2/2010 | Panga et al. | |
| 7,664,624 B2* | 2/2010 | Michel | E21B 41/0057 |
| | | | 703/2 |
| 7,774,183 B2 | 8/2010 | Tardy et al. | |
| 7,853,440 B2 | 12/2010 | Cohen et al. | |
| 8,265,915 B2* | 9/2012 | Hsu | E21B 49/006 |
| | | | 703/10 |
| 9,085,957 B2* | 7/2015 | Wallace | E21B 43/00 |
| 9,098,889 B2 | 8/2015 | Zhao et al. | |
| 9,109,440 B2 | 8/2015 | Qiu et al. | |
| 9,482,079 B2 | 11/2016 | Li et al. | |
| 9,534,489 B2 | 1/2017 | Wang et al. | |
| 9,670,753 B2 | 6/2017 | Filippov et al. | |
| 2007/0244681 A1 | 10/2007 | Cohen et al. | |
| 2015/0066451 A1 | 3/2015 | Li et al. | |
| 2015/0285045 A1 | 10/2015 | Ziauddin et al. | |
| 2016/0003019 A1* | 1/2016 | Safariforoshani | E21B 43/26 |
| | | | 166/308.1 |

OTHER PUBLICATIONS

International Search Report and Written Opinion regarding corresponding PCT Application No. PCT/US2018/057774, dated Jul. 1, 2019.

Liu, Piyang, et al., "3-D Modelling and Experimental Comparison of Reactive Flow in Carbonates under Radial Flow Conditions," Scientific Reports, 2017, 7:17711, 11 pages.

Safari, R., et al., "Near Wellbore Carbonate Rock Failure Model with Acid-Weakening Effects," American Rock Mechanics Association, 2018, 18-909, 13 pages.

Omer, Mohammed, et al., "No. More Premature Collapse of Acid Wormholes: Extend Wells Productivity with Particulate Diversion Technique Modelling," Society of Petroleum Engineers, SPE-202670-MS, 2020, 13 pages.

Perez, Oswaldo, et al., "Optimizing Limestone Acidizing Treatments in Perforated Horizontal Completions by Implementing a Physics-based Tool," 2019 Abu Dhabi International Petroleum Exhibition and Conference, SPE-197719-MS, 2019, 25 pages.

Safari, Reza, et al., "Analysis and Design Method for Particulate Diversion in Carbonate Acidizing," Society of Petroleum Engineers, SPE-187525-MS, 2017, 15 pages.

* cited by examiner

SYSTEMS AND METHODS TO INCREASE THE DURABILITY OF CARBONATE RESERVOIR ACIDIZING

FIELD OF THE TECHNOLOGY

The present application relates to techniques for carbonate reservoir acidizing.

BACKGROUND

Carbonate reservoir acidizing is a widely used technique to stimulate wells, whereby an acid solution is injected into the formation to induce branches of open channels by dissolving minerals and by-passing damage to the near-well formation during drilling and well completion processes. The objective in this process is to reduce the resistance to the flow of reservoir fluids due from a naturally tight formation, or even to reduce the resistance to flow of reservoir fluids due to damage. The efficiency of such a process depends on the type of acid used, injection conditions, structure of the medium, fluid to solid mass transfer, reaction rates, etc. While dissolution increases the rock porosity and permeability, the relative increase in the production for a given amount of acid is observed to be a strong function of the injection conditions.

SUMMARY

Embodiments disclosed herein provide methods of acidizing a formation traversed by a wellbore. According to some embodiments, the method comprises determining an optimized acidizing fluid. According to some embodiments, the method comprises providing the optimized acidizing fluid to the formation. According to some embodiments, determining the optimized acidizing fluid comprises providing a set of acidizing parameters. According to some embodiments, determining the optimized acidizing fluid comprises determining a distribution of reactive and non-reactive fluids along the wellbore during acidizing based on the set of acidizing treatment parameters. Some embodiments comprise determining a dissolution of the formation within a region of the wellbore based on the determined distribution of reactive and non-reactive fluids. Some embodiments comprise determining one or more mechanical parameters of the formation within the region of the wellbore based on the determined dissolution. Some embodiments comprise predicting damage to the formation during hydrocarbon production based on the determined mechanical parameters. Some embodiments comprise predicting an amount of hydrocarbon produced during hydrocarbon production based, at least in part, on the predicted damage. Some embodiments comprise adjusting the set of acidizing parameters to maximize the predicted amount of hydrocarbon produced during hydrocarbon production. According to some embodiments, the set of acidizing parameters comprise one or more parameters selected from the group consisting of an acid strength, an acid concentration, an acid volume, and an acid injection rate. According to some embodiments, determining a distribution of reactive and non-reactive fluids along the wellbore comprises determining a wellbore flow model of the formation based on an initial characterization of the formation and one or more multi-physics and/or multiscale simulations of the formation. According to some embodiments, the initial characterization of the formation comprises one or more formation parameters selected from the group consisting of a type of hydrocarbon fluid in the formation, a configuration of the wellbore, a static fluid inside the wellbore, a distribution of rock properties along the wellbore, a completion type, and a production enhancement. According to some embodiments, determining a distribution of reactive and non-reactive fluids along the wellbore during the acidizing treatment comprises determining wormhole penetration into the formation. According to some embodiments, determining a dissolution of the formation within a region of the wellbore comprises determining a porosity profile of the formation within the region of the wellbore. According to some embodiments, determining one or more mechanical parameters of the formation comprises determining one or more mechanical parameters selected from the group consisting of Young's modulus, bulk modulus, shear modulus, cohesion, internal friction angle, and pore-collapse pressure. According to some embodiments, predicting damage to the formation during hydrocarbon production comprises determining one or more of shear failure and compressive failure within the formation. According to some embodiments, the one or more of shear failure and compressive failure within the formation is determined based on porosity of the formation. According to some embodiments, predicting damage to the formation during hydrocarbon production comprises determining one or more of shear failure and compressive failure that extends beyond a wormhole penetration radius from the wellbore.

Further aspects of the disclosure provide methods of optimizing an acidizing treatment of a formation traversed by a wellbore. According to some embodiments, the method comprises, for an initial set of acidizing parameters, determining a distribution of reactive fluid along the wellbore. According to some embodiments, the method comprises using a finite element model to determine porosity evolution along the wellbore based on the determined distribution of reactive fluid. According to some embodiments, the method comprises determining one or more mechanical parameters of the formation based on the determined porosity evolution. According to some embodiments, the method comprises determining a damage radius along the wellbore based on the one or more mechanical properties. According to some embodiments, the method comprises predicting an amount of hydrocarbon produced from the formation during hydrocarbon production based on the determined damage radius. According to some embodiments, the method comprises adjusting the initial set of acidizing parameters to maximize the predicted amount of hydrocarbon produced during hydrocarbon production. According to some embodiments, the mechanical parameters of the formation comprise one or more parameters selected from the group consisting of Young's modulus, bulk modulus, shear modulus, cohesion, internal friction angle, and pore-collapse pressure. According to some embodiments, the method further comprises determining an extent of wormhole penetration into the wellbore. According to some embodiments, the method further comprises comparing the extent of wormhole penetration into the wellbore to the determined damage radius along the wellbore.

Further aspects of the disclosure provide embodiments of a non-transitory computer readable medium having instructions stored therein, which when executed by a computer cause the computer to perform various operations. According to some embodiments, the operations comprise, for an initial set of acidizing parameters, determining a distribution of reactive fluid along the wellbore. According to some embodiments, the operations comprise determining a dissolution of the formation within a region of the wellbore based on the determined distribution of reactive and non-reactive fluids. According to some embodiments, the operations comprise determining one or more mechanical parameters of the formation within the region of the wellbore based on the determined dissolution. According to some embodiments, the operations comprise predicting damage to the formation during hydrocarbon production based on the determined mechanical parameters. According to some embodiments, the operations comprise predicting an amount of hydrocarbon produced during hydrocarbon production based, at least in part, on the predicted damage. According to some embodiments, the operations comprise adjusting the set of acidizing treatment parameter to maximize the predicted amount of hydrocarbon produced during hydrocarbon production. According to some embodiments, the initial set of acidizing parameters comprise one or more parameters selected from the group consisting of an acid strength, an acid concentration, an acid volume, and an acid injection rate. According to some embodiments, determining a distribution of reactive and non-reactive fluids along the wellbore during the acidizing treatment comprises determining wormhole penetration into the formation. According to some embodiments, determining a dissolution of the formation within a region of the wellbore comprises determining a porosity profile of the formation within the region of the wellbore. According to some embodiments, determining one or more mechanical parameters of the formation comprises determining one or more mechanical parameters selected from the group consisting of Young's modulus, bulk modulus, shear modulus, cohesion, internal friction angle, and pore-collapse pressure. According to some embodiments, predicting damage to the formation during hydrocarbon production comprises determining one or more of shear failure and compressive failure that extends beyond a wormhole penetration radius from the wellbore.

DETAILED DESCRIPTION

Figure 1:
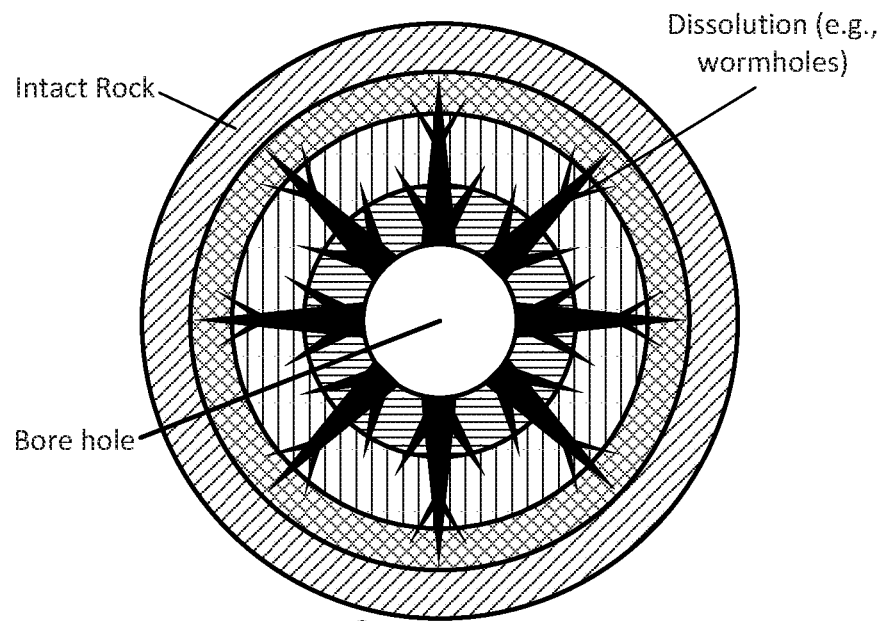
FIG. 1 shows a schematic representation of a cross-section of a wellbore and formation.

As acid is injected into carbonate rock, the local pressure increases, local rock temperature changes, and the injected acid dissolves the rock and increases the local porosity (i.e. by different dissolution patterns). FIG. 1 illustrates how the rock porosity is changed differently at different radial distances from the wellbore at wormhole dissolution pattern.

One of the sources of damage in stimulated carbonate rock is the loss of near wellbore formation compressive strength, which may result in casing collapse under extreme conditions. The differential rock weakening at different radial distance from the wellbore can cause rock to be compacted during production time and can counterbalance the stimulation effect. Field studies have shown that the failure of acidized rock may cause damage and thereby negatively impact production. Thus, while acidizing can be effective at stimulating production, particularly in the near term following treatment, production over extended periods of time can be reduced due collapse because of failure in the compressive strength of the formation.

In the instant disclosure, an integrated laboratory measurements and analysis/design workflow is presented to simulate acid placement in carbonate reservoirs and model stimulated rock behavior during the productive lifetime of the well. Embodiments of the workflow can be utilized to design a unique approach to carbonate acidizing and optimize the strategy to maximize hydrocarbon recovery. Aspects of the workflow described herein account for the realization that wormholes induced during acidizing may eventually collapse during production, which can negatively impact production. Thus, the disclosed workflow seeks to optimize acidizing conditions to maximize hydrocarbon recovery by balancing the increased short-term production arising because of induced wormholes and increased hydrocarbon flow against the instability of the formation arising because of rock dissolution.

Aspects of the disclosed methods and workflow allow an operator or service provider to select and optimize acidizing parameters to maximize long-term hydrocarbon production following acidizing treatment. For example, a service provider may select a particular acid and/or acid concentration that maximizes hydrocarbon production. Examples of acids that may be chosen include, but or not limited to, hydrochloric acid (HCl), acetic acid, hydrofluoric acid (HF), formic acid, and the like. The methods also allow a service provider to select an optimized volume of acidizing fluid to use and an optimized placement for the acidizing fluid, optimized injection rates, flush rates and the like.

Figure 2:
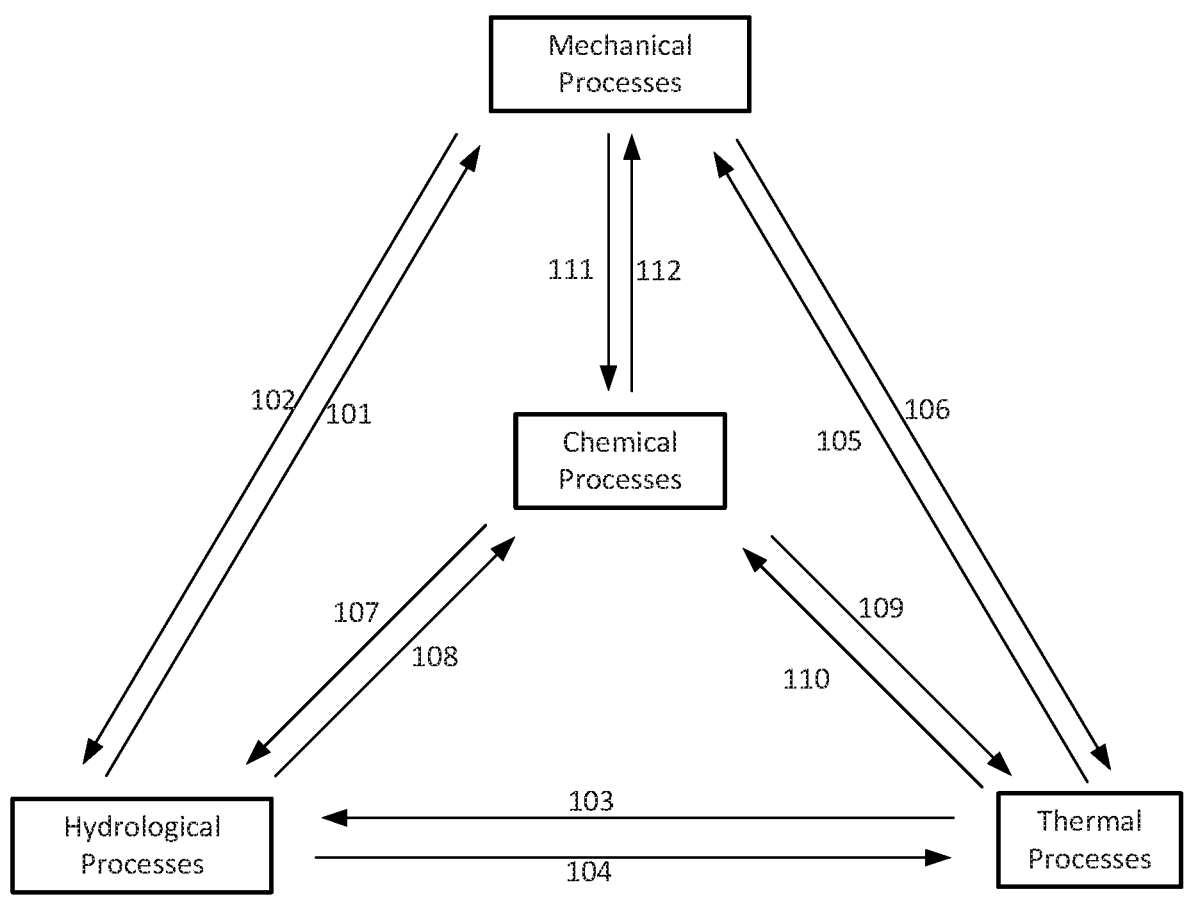
FIG. 2 shows mechanical, chemical, thermal and hydrological processes occurring as acid is injected into carbonate rocks.

FIG. 2 illustrates some of the interrelated mechanical, chemical, thermal and hydrological processes occurring simultaneously as acid is injected into carbonate rocks. Such processes include:

101 Stress state variations due to acid injection;
102 Pore pressure alterations due to effective stress changes;
103 Pore pressure changes due to temperature variation;
104 Temperature changes due to fluid flow;
105 Thermal induced stress;
106 Mechanical energy conversion into thermal energy;
107 Pore pressure variation due to acid concentration changes;
108 Acid concentration changes due to fluid flow;
109 Temperature changes due to chemical reaction;
110 Chemical activity variations due to temperature changes;
111 Chemical potential changes due to mechanical energy; and
112 Damage and elasticity factor changes due to chemical reaction.

Including all of these processes and factors into a stimulation analysis and design can be impractical. The disclosed methods simplify the relationships between various of these factors to provide an integrated approach to analyze carbonate acidizing and to maximize hydrocarbon recovery by optimizing stimulation design. Aspects of the disclosed methods (1) determine mechanical damage to acidized rock during post treatment conditions, and (2) optimize initial stimulation design, (i.e. by changing type of acid, acid concentration, type of diversion, etc.). The optimized acidizing package minimizes the induced mechanical damage and at the same time maximize the long-term production.

Figure 3:
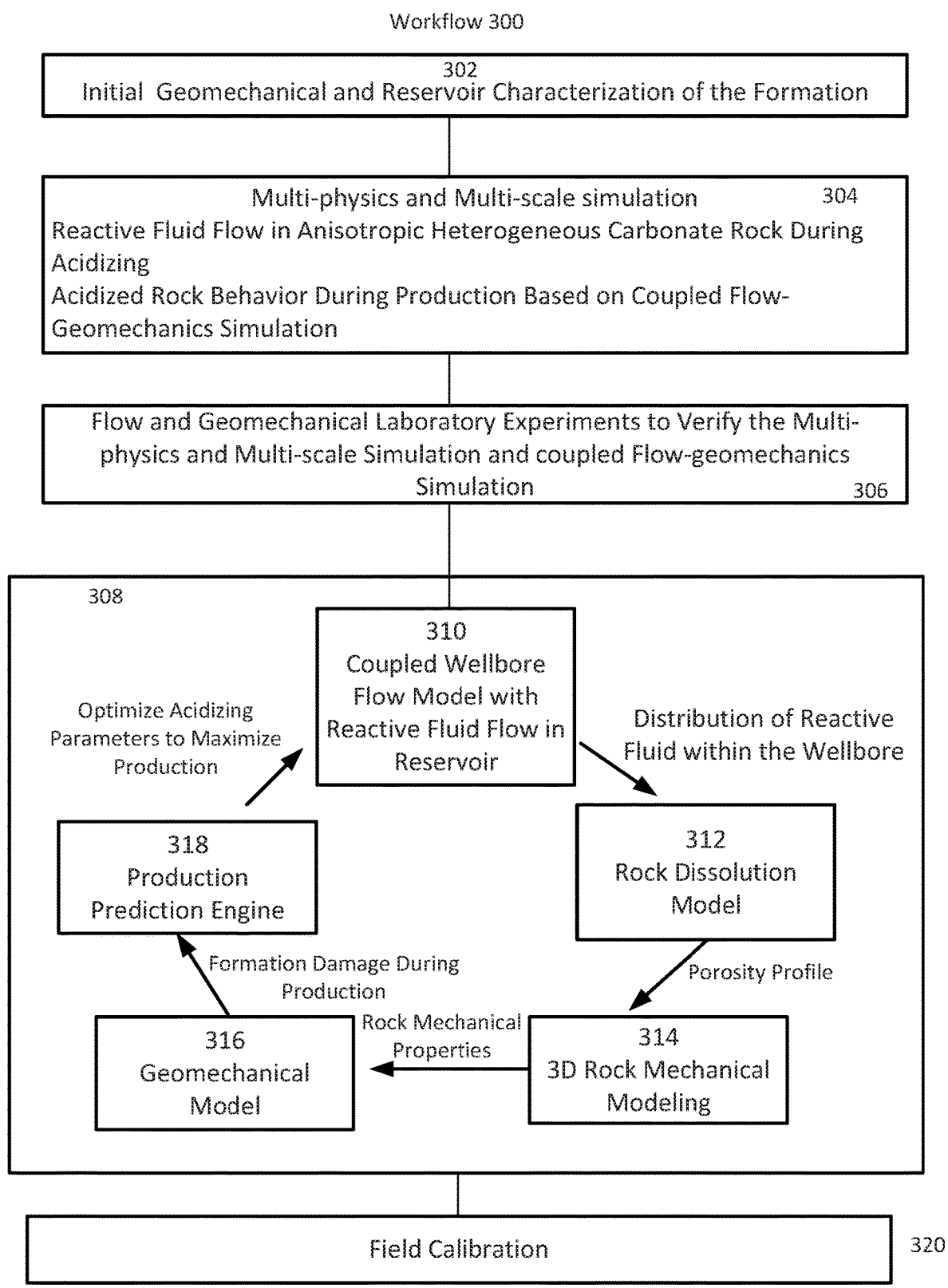
FIG. 3 shows a workflow for optimizing acidizing parameters.
Figure 4:
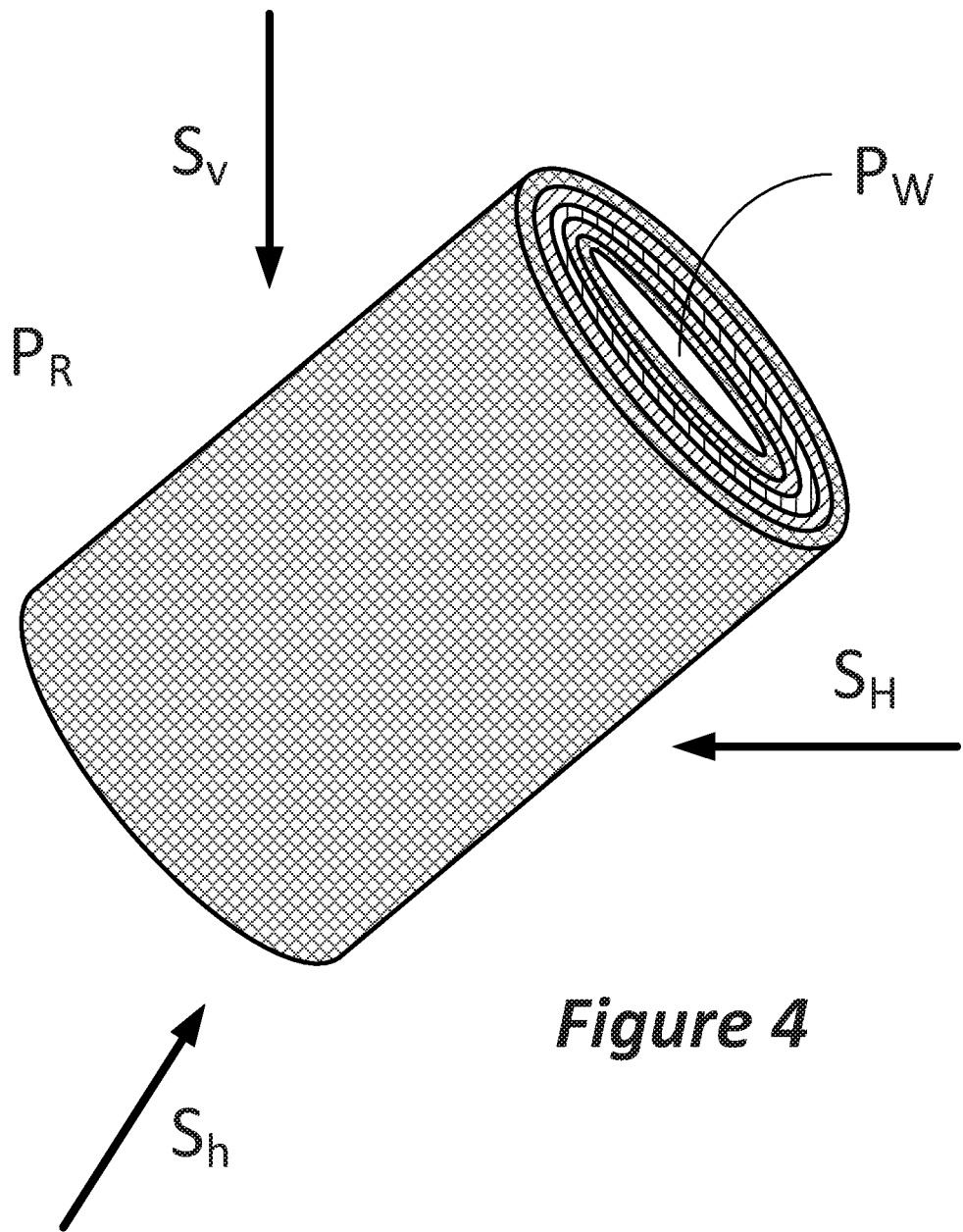
FIG. 4 shows forces acting on a section of a wellbore.

Embodiments of the systems and methods described herein include verified simulations and validated and calibrated engineering solutions to effectively design carbonate reservoir stimulation. FIG. 3 illustrates an embodiment of a workflow 300 as described herein.

According to one embodiment, the workflow 300 utilizes an initial geomechanical and reservoir characterization of the formation 302. The success of acidizing and the increase in production is tied to the right selection of stimulation fluids/technology based on the type of formation, reservoir heterogeneity (i.e. permeability, porosity, pressure, or temperature contrast along the productive length of well), and the length of treatment. Embodiments of the optimized stimulation plan relies on field data, drilling data, completion data, core characterization, reliable logging data, core-log correlation, and expected production after stimulation. Key data that included in the initial geomechanical and reservoir characterization 302 of the formation can include:

Type of hydrocarbon fluid, (i.e. black oil, volatile oil, retrograde gas, wet gas, or dry gas);

Wellbore schematics, (i.e. a wellbore configuration such as a drilling survey, casing and tubing information, etc.);

Treatment conducting tubing properties, (i.e. production tubing, wellbore annulus, coiled tubing, etc.);

Static fluid inside the wellbore, (i.e. static column of oil, emulsion, water, or completion fluid);

Wellbore drainage geometry and its driving mechanism;

Distribution of rock properties along the wellbore at the time of stimulation. This can be classified into three major categories:

Core scale reservoir/geological properties: rock mineralogy along the well, rock density, pore pressure, temperature, permeability, porosity, pore fluid viscosity, total compressibility, estimated damage radius, and damage rock permeability/porosity);

Pore scale reservoir properties: pore structure, interfacial area, areal average of pore radius, and permeability evolution law by increasing porosity, asymptotic Sherwood number for pore structure, and pore length to pore diameter ratio; and Geomechanical properties profile along the wellbore: in-situ stress, critical porosity, Young's modulus, Poisson's ratio, unconfined compressive strength (UCS), internal friction angle, and pore collapse pressure;

Completion type along the wellbore, (i.e. open-hole completion, perforated casing, slotted liner, or combination); and Production enhancement target for the stimulation.

According to some embodiments, the workflow 300 uses multi-physics and multi-scale simulations 304 to model (1) reactive fluid flow in anisotropic heterogeneous carbonate rock during acidizing and (2) acidized rock behavior during production based on coupled flow-geomechanics simulation. The characteristics of carbonate rock dissolution are affected by acid mass transfer at Darcy scale and acid-carbonate reaction at the pore scale. The modeling of reactive fluid flow in anisotropic heterogeneous carbonate rock during acidizing considers acid mass dispersion at Darcy-scale and acid-carbonate reaction at pore-scale to investigate 3D rock dissolution configuration near a wellbore. The multi-physics-based simulation improves the prediction of carbonate dissolution pattern by studying the influence of various rock environments and operational parameters like injection rate. For example, the simulation can predict dissolution patterns, such as face dissolution, conical wormhole formation, wormhole, ramified wormhole, and uniform dissolution regimes as a function of injection rate.

The coupled flow geomechanics simulation provides knowledge of dissolution phenomena and gain insights regarding to carbonate rock behavior during acid injection. It also informs the impact of the dissolution on long-term well performance.

Laboratory experiments 306 can be used to verify the simulations. The purpose of the simulation verification is to confirm that the simulation prediction is working as intended. Laboratory experiments can be used to identify and eliminate implementation errors within the code (software quality assurance) and to verify the correctness of the numerical algorithms that are implemented in the code (numerical algorithm verification). Once the modeling of reactive fluid flow in anisotropic heterogeneous carbonate rock during acidizing is verified, the coupled flow-geomechanics simulation can be examined by comparing the stability and productivity characteristics of wormholes predicted by the coupled simulation to hydrostatic loading experiments. During second simulation verification, core-plug samples can be acidized and subsequently mounted in a compaction cell and hydrostatically loaded. According to some embodiments, three experimental measurements can be compared with coupled flow-geomechanics simulation during hydrostatic loading: (1) pressure drop between start and end of core plug, (2) volumetric strain, and (3) compressibility.

As strong or weak acid injected into carbonate rocks, geochemical reactions between the acid and the host formation occurs. This leads to rock dissolution and modifications of the rock flow and geomechanical properties. Dissolution patterns in core plugs can be formed by acid flow. The acid-flooded samples can be mounted in a compaction cell and hydrostatically loaded beyond pore-collapse pressure. Dissolution pattern collapse and pore collapse can be checked in stress-strain curves. Dissolution pattern collapse can also be checked by CT images of compacted samples. Mechanical and physical properties of the samples can be predefined for any acid-flooding test. Exemplary properties include density, permeability, porosity, ultimate compressive strength, modulus of elasticity, Poisson's ratio, cohesion, friction angle, and pore collapse pressure. Chemical composition of the rock can also be identified, for example, using x-ray fluorescence (XRF) or scanning electron microscopy (SEM) elemental analysis.

The tests can be carried out on core plugs, for example, 1.5"-diameter plugs. In a first step, acid is flowed through the sample, resulting in dissolution formation, and the acid flow is stopped after it breakthrough. In a second step, the samples can be mounted in a compaction cell and hydrostatically loaded beyond pore-collapse pressure. CT scans of the samples can be taken before and after the compaction tests. The samples can be mounted in a Hassler cell that allows for fluid flow through the sample and application of confining stress.

The results of the multi-physics and multi-scale simulation(s) and coupled flow-geomechanics simulation(s) are incorporated into a quantitative integrated engineering solution 308 that describes the equivalent flow enhancement by acidizing. The quantitative engineering solution can determine the type of dissolution pattern and the extent of the pattern, i.e., its "equivalent size". The dependence of reservoir properties on equivalent size can be studied based on validated multi-physics simulation. The validated simulation results can be interpreted and employed to derive an engineering correlation that relates equivalent size and dissolution pattern to reservoir properties and operational parameters.

The quantitative integrated engineering solution 308 can be utilized in the disclosed integrated approach to analyze carbonate acidizing and subsequently maximize the hydrocarbon recovery by optimizing stimulation design.

The quantitative integrated engineering solution 308 comprises a coupled wellbore flow model 310, which considers fluid interfaces, transient reservoir inflow, and dynamic skin evolution due to rock dissolution. The coupled wellbore flow model 310 simulates the dynamic change of injectivity as acid moves inside the wellbore and contacts the rock (i.e. acid contacts top reservoir first and increase the injectivity before it reaches to lower reservoir). Within the coupled wellbore flow model, the wellbore and reservoir can be divided into many segments. For each segment, the model considers the interactions between different rocks at different locations along the well during the stimulation. For example, within a segment, the model can consider different fluids, inflow rates, outflow rates and leak-off into the reservoir, and reservoir characteristics at each segment.

According to some embodiments, the coupled wellbore flow model 310 integrates a wellbore flow module, which calculates hydrostatic pressure drop, as:

$$\frac{\partial P_w}{\partial x} = \rho \times g \times dz \mp \frac{2f_f u^2 \rho}{D} \quad (1)$$

where x is wellbore direction, $P_w$ is wellbore pressure, $\rho$ is fluid density, g is the gravitational constant, dz is a change in elevation, $f_f$ is Fanning friction factor, u is fluid velocity, and D is hydraulic diameter of wellbore. The positive or negative sign in the equation can be defined based on the direction of flow inside wellbore.

The rate of flow rate change inside wellbore can be represented by material balance equation:

$$\frac{\partial q_w}{\partial x} = -q_R \quad (2)$$

where $q_w$ is the flow rate inside the wellbore, and $q_R$ is the fluid injection rate into reservoir.

The fluid interfaces in the model can be tracked at each time based on the material balance. It is assumed that the total time of stimulation is divided into small time steps and the condition of wellbore and reservoir is updated after each time step. It is also assumed that wellbore pressure and flow rate are constant during each time step.

The wellbore pressure dynamics for the duration of stimulation can be considered. The superposition is applied to account for wellbore pressure variation:

$$-\frac{2\pi k l}{\mu}(P_R - P_W) = \sum_{j=1}^{n} \Delta q_j [p_D(t_n - t_{j-1})] + q_n s_n \quad (3)$$

where k is the permeability of reservoir rock, l is the length of wellbore segment, $\mu$ is the viscosity of reservoir fluid, $P_R$ is reservoir pressure at each element at current condition, $P_W$ is wellbore pressure at time $t_n$, $\Delta q_j = q_j - q_{j-1}$, $t_n$ is nth time step, $q_n$ is inflow into reservoir at time $t_n$, $s_n$ is the local skin factor that changes continuously when acid reacts with the rock and also when the particulate diversion system hits the formation, and $p_D$ is dimensionless pressure function that can be defined based on the direction of well (vertical or horizontal), reservoir shape, and the time of injection.

Note that regardless of wellbore direction (i.e. vertical, horizontal, or deviated wellbore), it may be assumed that the fluid is invaded into reservoir perpendicular to the wellbore direction. Equations (1) and (3) coupled together thru wellbore material balance equation (2) and the resultant algebraic equation is solved with appropriate initial and boundary conditions.

According to some embodiments, the coupled wellbore flow model 310 can include a module that predicts wormhole penetration under downhole conditions. According to some embodiments, the model is based on diffusion being the limiting mechanism for acid transport and does not consider the role of fluid loss. Examples of methods for predicting wormhole penetration are described in the literature. See, e.g., Daccord, G., Lenormand, R., & Liétard, O. (1993) Chemical dissolution of a porous medium by a reactive fluid—I. Model for the "wormholing" phenomenon, *Chemical Engineering Science*, 48(1), 169-178; and Daccord, G., Touboul, E., & Lenormand, R. (1989) Carbonate Acidizing: Toward a Quantitative Model of the Wormholing Phenomenon *SPE Production Engineering*, 4(01), 63-68. This model may overestimate the distance of wormhole penetration, but it can be modified thru comparison between core studies and field results, as described below.

According to some embodiments, the coupled wellbore flow model 310 can include a skin model that accounts for completion skin (perforation completion and slotted liner completion), near wellbore condition skin (i.e. permeability change or fluid viscosity change), and the combination of these skins with wormhole penetration dynamics.

The components of the coupled wellbore flow model 310 are combined and the resultant equations solved by considering a discretized form of the wellbore. The model provides the following outputs: (1) a prediction of wellhead and bottom hole pressure during stimulation; (2) dynamics of wellbore skin improvement during stimulation; and (3) a distribution profile of different fluid along reservoir. The distributions of reactive and non-reactive fluids along the wellbore at times during stimulation can be considered as the input for rock dissolution model 312, as shown in FIG. 3.

Referring again to FIG. 3, the integrated engineering solution 308 can comprise a rock dissolution model 312 that simulates rock dissolution along the wellbore. As acid reacts with carbonate rock, it dissolves soluble minerals and increases the porosity of the formation. There are different types of dissolution patterns based on live acid injection into rock. At low injection rates, all the soluble material may be dissolved (face dissolution) and the rock permeability rises to infinity. At high injection rates, rock porosity is increased homogeneously (uniform dissolution) and permeability enhanced. Intermediate injection rates may create long infinite conductive channels called wormholes. The formation of wormholes is also highly dependent on rock heterogeneity, pore structure, molecular diffusion, and reaction rate. Wormhole dissolution patterns may be considered the most optimized pattern since it is the most extensive dissolution with the lowest volume of acid. However, many operational and environmental conditions may prevent the formation of wormholes. This necessitates a physics-based model capable of describing different rock dissolution patterns and acid transport in a carbonate rocks.

Carbonate dissolution occurs when live acid transports in the rock and dissolves the rock at the surface of pore structures. Acid transport takes place at the Darcy scale and rock dissolution occurs at the pore scale. Therefore, a two-scale model best describes the phenomenon. Two-scale models based on Partial Differential Equation (PDE) can be solved numerically in four dimensions (4D, i.e., Space and time) to determine the final rock dissolution pattern. However, with current computational power it may be impractical to apply the 4D numerical simulation at every measured depth along the wellbore.

The coupled wellbore, reservoir, and wormhole models provided herein provide the variations of reactive and non-reactive fluid volume squeezed into every measured depth along the stimulation timeframe. It may be assumed here that the acid radially flows and dissolves the rock and that there is no tangential acid flow. Taking this assumption into account, the developed PDEs can be non-dimensionalized in the cylindrical coordinates system using following dimensionless variables:

$$\xi = \frac{r}{r_e}, \alpha_w = \frac{r_0}{r_e}, u_r = \frac{u}{u_0}, t' = \frac{t}{r_e/u_0}, \zeta_p = \frac{r_p}{r_{p0}}, A_v = \frac{a_v}{a_0},$$

$$\kappa = \frac{K}{K_0}, c_f = \frac{C_f}{C_0}, \eta = \frac{2r_{p0}}{r_e}, \phi^2 = \frac{2k_s r_{p0}}{D_m}, D_a = \frac{k_s a_0 r_e}{u_0}$$

$$N_{ac} = \frac{\alpha C_0}{\rho_s}, P_e = \frac{u_0 r_e}{D_m}, \Phi^2 = \frac{k_s a_0 r_e^2}{D_m}$$

where r is the radius in cylindrical coordinate, $r_e$ is the external radius of the model that fluid radial velocity is negligible, $r_0$ is wellbore radius, u is radial velocity as a function of radius and time, $u_0$ is the inlet radial velocity of reactive or non-reactive fluid into every reservoir section along the wellbore as a function of time (as provided from coupled wellbore, reservoir, and wormhole models), t is time, $r_p$ is pore radius as a function of radius and time, $r_{p0}$ is the initial pore radius, $a_v$ is interfacial pore area as a function of radius and time, $a_0$ is initial interfacial pore area, K is permeability as a as a function of radius and time, $K_0$ is initial rock permeability, $C_f$ is concentration of acid as a function of radius and time, $C_0$ is inlet acid concentration as a function of time (as provided from the coupled wellbore, reservoir, and wormhole models), $D_m$ is the effective molecular diffusivity of the reactive fluid, $k_s$ is the surface reaction rate constant with the velocity unit, a is acid dissolving power, which is defined as the grams of solid dissolved per mole of acid. The introduced dimensionless parameters are pore-scale Thiele number $\phi^2$, the Damkohler number, the acid capacity number $N_{ac}$, the radial Peclet number $P_e$, and macroscopic Thiele number $\Phi^2$.

The one-dimensional dimensionless equations in cylindrical coordinates are:

$$\frac{\partial \varepsilon}{\partial t'} = \frac{1}{\xi}\frac{\partial}{\partial \xi}(\xi u_r) \quad (4)$$

$$\frac{\partial(\varepsilon c_f)}{\partial t'} + \frac{1}{\xi}\frac{\partial}{\partial \xi}(\xi u_r c_f) = \frac{1}{\xi}\frac{\partial}{\partial \xi}\left[\xi\left\{\frac{\alpha_{os}\varepsilon D_a}{\Phi^2} + \lambda_r|u_r|\zeta_p\eta\right\}\frac{\partial c_f}{\partial \xi}\right] - \frac{D_a A_v c_f}{\left(1+\frac{\phi^2 \zeta_p}{Sh}\right)} \quad (5)$$

$$\frac{\partial \varepsilon}{\partial t} = \frac{D_a N_{ac} A_v c_f}{\left(1+\frac{\phi^2 \zeta_p}{Sh}\right)} \quad (6)$$

Equation (4) describes the dimensionless continuity condition and relates the increase in rock local porosity to the change in the local velocity. Equation (5) presents the dimensionless mass balance for the acid species. The first and second terms on the left-hand side are the accumulation and convection terms, respectively, while the first term on the right-hand side represents dispersion of acid species. The second term on the right-hand side represents the mass transfer of acid species from the bulk fluid phase to the fluid-solid interface. Equation (6) states that the mass of acid species transported to the fluid-solid interface is reacted on the surface. In the above equations $\alpha_{os}$ is a constant that depends on the structure of the porous medium (for example, tortuosity or connectivity between the pores), Ur is radial velocity, Sh is Sherewood number, and ε is porosity.

According to some embodiments, the corresponding boundary and initial conditions are:

$$\left\{\begin{array}{l} u_r = 1.0 \\ c_f = 1.0 \\ \frac{\partial \varepsilon}{\partial \xi} = 0.0 \end{array}\right\} @\xi = \alpha_w, \quad (7)$$

$$\left\{\begin{array}{l} u_r = 0.0 \\ \frac{\partial c_f}{\partial \xi} = 0.0 \\ \varepsilon = \varepsilon_0 \end{array}\right\} @\xi = 1,$$

$$\left\{\begin{array}{l} u_r(\xi) = 0.0 \\ c_f(\xi) = 0.0 \\ \varepsilon(\xi) = \varepsilon_0 \end{array}\right\} @t' = 0.0$$

where $\varepsilon_0$ is the initial porosity of the media. The coupled transient PDE equations (4), (5), and (6) with boundary and initial conditions (7) can be solved using Finite Element Method and the porosity and the radial profile of porosity acid concentrations can be calculated. The final porosity profile for each measured depth can be provided to the 3D rock mechanical model 314 which models the weakened rock and calculates mechanical properties of rock at each radius.

Referring again to FIG. 3, the embodiments of the integrated engineering solution 308 includes a 3D rock mechanical model 314 that models how the rock is weakened due to acidizing. Rock dissolution (i.e. face dissolution or wormhole propagation, etc.) is a major reason for acidized well production enhancement. However, as acid is injected into wellbore, rock is weakened at different levels and stresses around the wellbore can be changed. The stress changes can neutralize the enhancement of acid injection by breaking and closing induced wormholes and in some instances, may induce casing collapse.

Different dissolution patterns differently affect rock stiffness and strength. For example, face dissolution only increases wellbore radius and does not generally considerably alter the remaining rock stiffness and strength. Induced wormholes and/or uniform dissolution generally have the greatest effect on stiffness and strength reduction of rock. As the near wellbore rock loses stiffness, it will pass the excess load to the adjacent rock, which may collapse.

According to some embodiments of the disclosed 3D mechanical modeling, the effective total porosity of acidized rock is assumed to be a reliable indicator of rock stiffness and strength parameters. The effective total porosity of stimulated rock at each measured depth along the wellbore is provided by the 3D rock mechanical model 314. Generally, the mechanical properties of the stimulated rock can be determined using any method known in the art, which methods have varying degrees of complexity. Embodiments of the disclosed 3D rock mechanical model uses analytical models that allow one to estimate elastic and failure properties of carbonates from porosity. Examples of rock mechanical modeling are described in the literature. See, for example, Bemer, E., Vincké, O., & Longuemare, P. (2004) Geomechanical Log Deduced from Porosity and Mineralogical Content, *Oil & Gas Science and Technology—Rev. IFP,* 59(4), 405-426; Bauer, A., Walle, L. E., Stenebraten, J., & Papamichos, E. (2013) *Impact of Acidizing-Induced Wormholes in Chalk on Rock Strength*, presented at the 47th U.S. Rock Mechanics/Geomechanics Symposium, San Francisco, Calif.; Dormieux, L., Jeannin, L., Bemer, E., Le, T. H., & Sanahuja, J. (2010) Micromechanical models of the strength of a sandstone, *International Journal for Numerical and Analytical Methods in Geomechanics,* 34(3), 249-271 doi:10.1002/nag.804; and Nguyen, M. T., Bemer, E., & Dormieux, L. (2011) *Micromechanical Modeling of Carbonate Geomechanical Properties Evolution During Acid Gas Injection*, presented at the 45th U.S. Rock Mechanics/Geomechanics Symposium, San Francisco, Calif. The rock mechanical properties (i.e., mechanical parameters) include bulk modulus, shear modulus, cohesion, internal friction angle, and pore-collapse pressure. The following relations provides reasonable estimation of elastic and plastic properties for limestone.

$$K(\varepsilon) = \frac{(1-\varepsilon) \times K_S}{1 - \varepsilon + \varepsilon \frac{K_S}{K_C}}, \quad K_S = 72.6 GPa, \quad (8)$$

$$\frac{K_C}{K_S} = 0.07$$

$$G(\varepsilon) = \frac{(1-\varepsilon) G_S}{1 - \varepsilon + \varepsilon \frac{G_S}{G_C}}, \quad G_S = 31.6 GPa, \quad (9)$$

$$\frac{G_C}{G_S} = 012$$

$$c'(\varepsilon) = c_0 \times \exp(-\alpha_c \times \varepsilon), \quad \varepsilon = 0/0, \quad (10)$$
$$c_0 = 40.3 MPa, \quad \alpha_c = 0.054$$

$$\varphi'(\varepsilon) = \alpha_f \varepsilon + \beta_f, \quad \varepsilon = 0/0, \alpha_f = -0.893, \quad \beta_f = 49.0 \quad (11)$$

$$p^*(\varepsilon) = p_0 \exp(-\alpha_p \times \varepsilon), \quad \varepsilon = 0/0, \quad (12)$$
$$p_0 = 601.6 MPa, \alpha_p = 0.083$$

where $K(\varepsilon)$ is bulk modulus as a function of porosity, $G(\varepsilon)$ is shear modulus as a function of porosity, $\acute{c}(\varepsilon)$ is cohesion as a function of porosity, $\varphi(\varepsilon)$ is internal friction angle as a function of porosity, $p^*(\varepsilon)$ is pore collapse pressure as a function of porosity. The presented rock physics model is an example of a limestone weakening model parameterized by final porosity of stimulated rock. Such a model for different types of rock is utilized in the integrated approach to estimate rock mechanical properties (elastic and plastic) for different levels of enhanced porosity. The 3D rock mechanical model 314 provides mechanical properties of the different concentric rock rings about the wellbore (as shown in FIG. 1), which are incorporated into the geomechanical stress analysis discussed below.

Referring again to FIG. 3, the integrated engineering solution 308 includes geomechanical model 316 of the wellbore for determining geomechanical factors that can lead to collapse within the rock layers within the acidized region of the wellbore over the productive life of the reservoir. As mentioned above, compaction of the stimulated rock can occur during production and neutralize the effects of acid stimulation. Therefore, the disclosed workflow analyzes the wellbore under possible drawdown scenarios to minimize undesired mechanical damage as stimulated rock is compacted and permeability is decreased.

The geomechanical model 316 provides an analytical stress analysis to predict the stress distribution in the wellbore, considering concentric rings of different mechanical properties, casing, cement, and different rings of weaken rock with different mechanical properties that are defined in a rock physical engine. Examples of geomechanical modeling techniques are described in the literature, for example, in Jo, H. (2008) *Mechanical Behaviour of Concentric and Eccentric Casing, Cement, and Formation Using Analytical and Numerical Methods*. (PhD), The University of Texas at Austin and Jo, H., & Gray, K. E. (2010) *Mechanical Behavior of Concentric Casing, Cement, And Formation Using Analytical And Numerical Methods*, presented at the 44th U.S. Rock Mechanics Symposium, Salt Lake City, Utah. The geomechanical model 316 can predict time dependent stresses and consequently shear-enhanced compaction and/or compaction that might be generated by drawdown variations inside the wellbore during production. In other words, the geomechanical model 316 predicts formation damage under various drawdown (i.e., production) conditions.

The determination of acidized rock behavior during production necessitates a complete picture of after-stimulation condition. According to some embodiments, the followings are defined for complete wellbore stress analysis after acidizing:

Current state of stress and pore pressure inside of the reservoir; which includes both magnitude and direction of principal stresses, Level of near-wellbore rock weakening due to stimulation at different section along the completed length of a well, Failure and mechanical properties of different weakened rock near the wellbore, and Stress distribution near the wellbore and prediction of any brittle or ductile failure.

Methods for predicting stress changes range from relatively simple analytical solutions to numerical modeling. According to some embodiments, analytical solutions are employed. Utilized solutions are based on the theories of inclusions and inhomogeneities and have the advantage of being easy to implement in the integrated framework due to their rapid computation times. See, e.g., Soltanzadeh, H., Hawkes Christopher, D., and Sharma Jitendra, S. 2007. Poroelastic Model for Production- and Injection-Induced Stresses in Reservoirs with Elastic Properties Different from the Surrounding Rock. *International Journal of Geomechanics* 7 (5): 353-361.

As acid reacts with carbonate rock, it dissolves soluble minerals, increases rock porosity, and induces different types of dissolution pattern. Relatively, any rock dissolution pattern (i.e. face dissolution or wormhole propagation) is the major reason for short or long-term production enhancement. However, it should be kept in mind that as acid is squeezed into the rock, the porosity is increased, and the rock is weakened at different levels as shown in FIG. 1. Accordingly, the stress concentration around the wellbore changes which might result in induced wormhole closure and subsequently neutralizing the effect of acid injection and in worst condition induces casing collapse.

According to some embodiments, it is assumed that the porosity of stimulated rock is an indicator of rock stiffness and strength parameters. The porosity of stimulated rock at each measured depth along the wellbore is determined based on the rock dissolution model 312 (FIG. 3). According to some embodiments, an underlying assumption of homogeneous rock porosity and permeability. As mentioned above, the rock dissolution model 312 calculates rock mechanical properties (i.e., mechanical parameters) including bulk modulus, shear modulus, cohesion, internal friction angle, and pore-collapse pressure.

FIG. 5 shows the geometry used to describe the stimulated wellbore under in-situ condition during post-stimulation production. The wellbore is assumed to have several concentric rings of carbonate rock with different mechanical properties. The outer ring is far enough to assume intact rock properties and close rings to the wellbore might be casing or cement sheath, if they are part of completion. The vertical stress $S_v$, horizontal stresses ($S_H$ and $S_h$), wellbore pressure $P_W$, and reservoir pressure $P_R$ are at current reservoir condition after stimulation. Moreover, temporal changes of wellbore pressure during post-stimulation are also considered.

There are numerous modeling approaches to calculate stress distribution around the stimulated wellbore. They can be categorized into analytical elastic/poroelastic solutions, and numerical elastoplastic models. Existing analytical solutions are not 3D and they are based on 2D plain strain theory. Albeit a wellbore satisfies requirements to apply the 2D plane strain condition, the axial tectonic stress along the wellbore induces in-plane stresses and makes the system a 3D problem. According to some embodiments, generalized plain strain theory is used to address the 3D characteristics of the problem. The engine can predict time dependent effective stresses generated by drawdown variations inside the wellbore during production.

According to some embodiments, a constitutive model determines the region in a representative stress space outside of which the rock cannot tolerate load and fails. The representative stress state is described by Terzaghi's effective stress state. See Vincké, O., Boutéca, M. J., Piau, J. M., and Fourmaintraux, D. 1998. Study of the Effective Stress at Failure. *In Biot Conference on Poromechanics*: 635-639. Since the stimulated rock is continuously under compressive loading, merely shear and compaction failure need be considered, according to some embodiments.

With carbonate rocks, the porosity level mainly controls rock yielding. At low porosity, the effective mean pressure at initial yielding and the gap between the hardening onset and the initial yielding are very high. High effective mean stress triggers shear-enhanced compaction and hardening due to grain crushing and pore collapse. On the other hand, brittle failure occurs at low effective mean stress. Limestone brittle failure can be mathematically described by Coulomb's law:

$$q = A + B \times p' \tag{14}$$

$$A = \frac{6 \times c \times \cos\varphi}{3 - \sin\varphi} \tag{15}$$

$$B = \frac{6 \times \sin\varphi}{3 - \sin\varphi} \tag{16}$$

where p' is effective mean stress, q is deviatoric stress, c is rock cohesion and φ is rock friction angle. The ductile failure (rock compaction) is also considered to account for possible collapse of rock after stimulation. The compaction curve is assumed as a circular cap that limits stress state in addition to brittle failure:

$$q^2 + p'^2 = (p^*)^2 \tag{17}$$

where p* is grain crushing and pore collapse pressure. To ensure an easy handling of the model, embodiments suppose that failure in Limestone is mainly controlled by the rock porosity.

Referring again to FIG. 3, embodiments of the integrated engineering solution 308 includes a production prediction engine 318. During the production (pre and post-stimulation phases), the wellbore pressure is changing with time so transient effects are occurring in the reservoir. Superposition principals can be employed to estimate outflow from different sections of reservoir. The production including the transient effect and dynamic skin as a result of geomechanical damage can be calculated as:

$$-\frac{2\pi k l}{\mu}(p_r - p_w) = \sum_{j=1}^{n} \Delta q_j [p_D(t_n^D - t_{j-1}^D)] + q_n s_n \tag{18}$$

where k is the permeability of reservoir rock, l is the length of reservoir segment (i.e. completion length of a section of reservoir), $p_r$ is reservoir pressure, $p_O$ is wellbore pressure, μ is viscosity of reservoir fluid, $t_n^D$ is dimensionless time at the nth time step, $p_D$ is dimensionless pressure, $q_n$ is production rate at the nth time step, $s_n$ is the skin factor at the nth time step, and $\Delta_{qj} = q_j - q_{j-1}$. The variables $t_n^D$ and $p_D$ can have different expressions for transient, late transient, steady state, or pseudo steady state condition of the reservoir. According to some embodiments it can be assumed that there is no cross-flow between each section of the wellbore. Note that the skin of each section of the reservoir can be updated based on the wellbore stress analysis and prediction of weakened rock compaction.

According to some embodiments, the wellbore can be divided into small elements with "$l_i$" length. The equation (18) can be applied for each segment to calculate production rate per each unit length of reservoir. By rearranging the equation (18), we have:

$$-\frac{2\pi k l}{\mu}(p_r - p_w) = \sum_{j=1}^{n-1} \Delta q_j^U [p_D(t_n^D - t_{j-1}^D)] - \\ q_{n-1}^U \times p_D(t_n^D - t_{n-1}^D) + q_n^U \times [p_D(t_n^D - t_{n-1}^D) + s_n], \tag{19}$$

where $$q_j^U = \frac{q_j}{l_1}$$

Further rearrangement yields:

$$q_n^U = -A_j \times (p_r - p_w) - B_j, \quad (20)$$

where $$A_j = \frac{2\pi k}{\mu \times [p_D(t_n^D - t_{n-1}^D) + s_n]},$$

and $$B_j = \frac{\sum_{j=1}^{n-1} \Delta q_j^U [p_D(t_n^D - t_{j-1}^D)] - q_n^D \times p_D(t_n^D - t_{n-1}^D)}{\mu \times [p_D(t_n^D - t_{n-1}^D) + s_n]}$$

Thus, equation (20) allows calculation of which is the unit production rate at every section of the reservoir, including transient effect of reservoir and reservoir skin evolution as different section of reservoir might compact during production.

It will be appreciated that the integrated engineering solution 308 allows acidizing parameters to be optimized with a view to maximizing production from the formation over time, rather than simply maximizing short term production, wormhole creation, or the like. As the integrated engineering solution accounts for both increases in production because of increases in porosity but also counterbalances the likelihood of formation damage due to mechanical weakening of the formation, the optimized parameters can maximize the time that acidizing treatment is effective.

The model first simulates stimulation fluid movement in the wellbore, and couples it with transient reservoir flow. The primary analysis provides the distribution of reactive fluid along the well. The rock dissolution at each section of reservoir is then analyzed by a discretizing continuum two-scale model with a finite element method (pore-scale and Darcy scale). This analysis presents porosity evolution at different locations along the well and at different radial distances from the wellbore center. The mechanical properties (elastic and failure properties) of rock at different radial distances are then computed based on the porosity alteration. Then, the developed stress analysis engine simulates the weakened rock under the in-situ stresses and bottom-hole pressure and predicts any possible compressional or shear failure. The model predicts the amount of hydrocarbon produce over time, considering compressional and/or shear failures. According to some embodiments, hydrocarbon production following acidizing treatment is predicted over a time period of weeks, months, and or years. For example, hydrocarbon production over a 6-month period may be predicted. Alternatively, hydrocarbon production over an 18-month time period may be predicted.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. Specifically, such programs/instructions may be stored on a non-transitory computer-readable medium. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a tile system, A program can be stored in a portion of a file that holds other programs or data (e.g., one or more scripts stored in a markup language document), in a single tile dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random-access memory or both. A computer includes a processor for performing actions in accordance with instructions and one or more memory devices for storing instructions and data A computer may also include or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (ea., the Internet), a network comprising a satellite link, and peer-to-peer networks (e.g., ad hoc peer-to-peer networks). The relationship of client and server arises by virtue of computer programs running on the respective computers and having a client-server relationship to each other, In some aspects, some or all of the features described here can be combined or implemented separately in one or more software programs for determining acid injection treatment parameters. The software can be implemented as a computer program product, an installed application, a client-server application, an Internet application, or any other suitable type of software.

Example

Aspects of the workflow 300 was applied to optimize the stimulation treatment of a high temperature horizontal wellbore with around 10500 feet measured depth and 250° F. temperature. The effect of stimulation fluid was modeled to optimize short term and long-term production. Two types of acid were considered: I) 15% HCl and II) 10% Acetic acid. A constant in Daccord model (see Daccord et al. *Chemical Engineering Science* 48 (1): 169-178, 1993) was identified for both acids from core flooding tests and previous field stimulations analysis as known in the art.

The wellbore schematics were as follows: a packer is installed at 8000 ft and completed zone is started from 8600 feet to 10475 feet. The wellbore is completed with cemented casing and perforated with 1 shot per 2 feet. Perforation has 18-inch length, 0° phasing angle, and 0.35-inch diameter. Initially the wellbore is filled with oil having a specific gravity of 0.88 and the viscosity is 1.2 cp at reservoir temperature. It is assumed that the total compressibility of reservoir is $10\text{-}6 \text{ psi}^{-1}$.

Figure 5A:
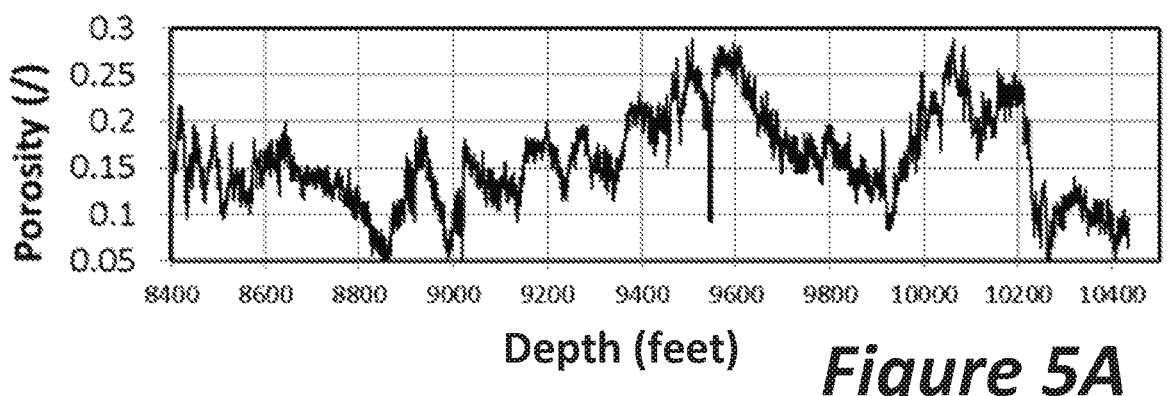
FIGS. 5A, 5B, and 5C show porosity, permeability, and stresses, respectively, on a section of a wellbore.
Figure 5B:
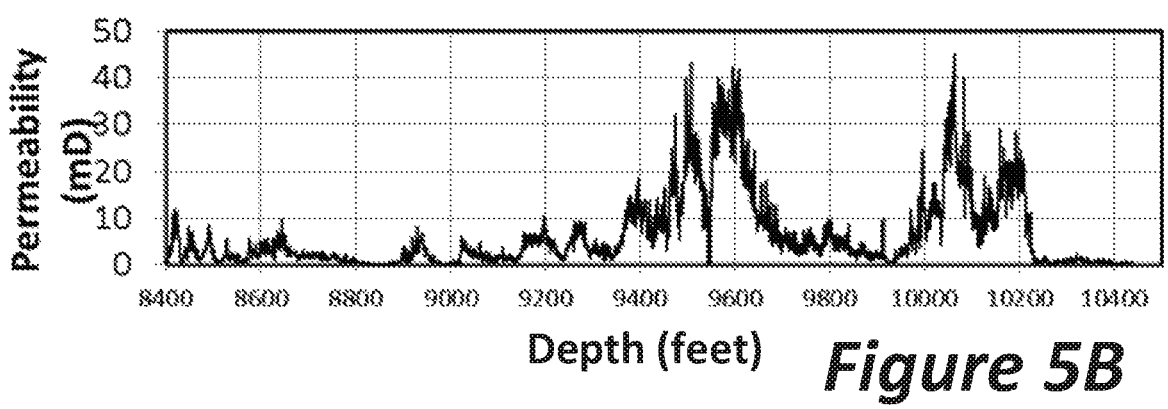
Figure 5C:
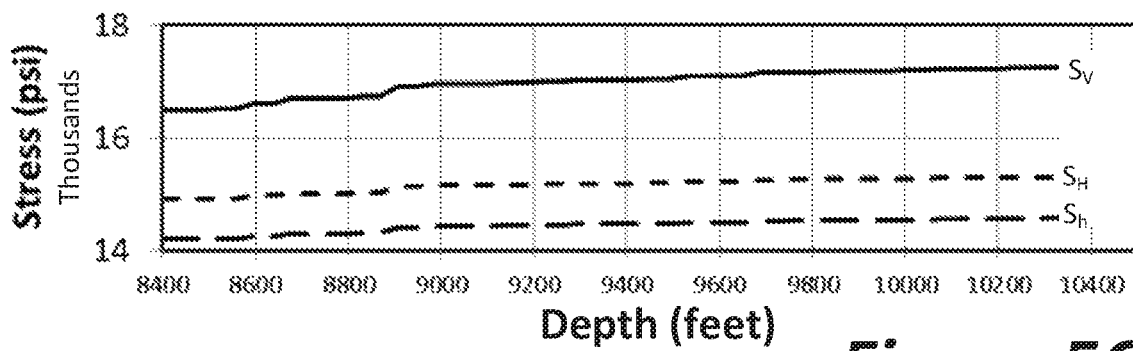

Table 1 shows wellbore construction data. It was assumed that both casing and tubing has 0.0001 relative roughness. It was assumed reservoir initial pressure was 3500 psi and reservoir temperature was 250° F. Porosity, permeability, and stresses (vertical stress $S_V$, and horizontal stresses $S_H$ and $S_h$) are shown in FIGS. 5A, 5B, and 5C, respectively. Young's modulus, Poisson's ratio, cohesion, friction angle, and pore collapse pressure for each section of reservoir along wellbore were estimated based on initial porosity as known in the art (see Bemer et al., *Oil & Gas Science and Technology—Rev. IFP* 59 (4): 405-426, 2004). It was estimated that the damage radius along the wellbore is 18 inches deep with 10 times permeability reduction. The resultant skin was approximately 38.

TABLE 1

Wellbore Construction Data.

| MD (ft.) | Well Radius (in) | Casing ID (in) | Casing Roughness | Tubing ID (in) | Tubing OD (in) | Tubing Roughness |
|---|---|---|---|---|---|---|
| 3303 | 12.25 | 9.625 | 0.0001 | 2.548 | 3.5 | 0.0001 |
| 5165 | 8.75 | 6 | 0.0001 | 2.548 | 3.5 | 0.0001 |
| 8300 | 8.75 | 6 | 0.0001 | 2.259 | 2.875 | 0.0001 |
| 8393 | 8.75 | 6 | 0.0001 | 0 | 0 | 0 |
| 10500 | 8.75 | 6 | 0.0001 | 0 | 0 | 0 |

The initial stimulation package considered included 300 bbl. of pre-flush, 1850 bbl. of 15% HCl acid (around 1 bbl. per each feet of completion), and 500 bbl. of post flush. The injection rate and total volume of injected acid were first optimized without considering the rock behavior during production. It was assumed that the horizontal wellbore was fully penetrated in the middle of a box-shaped drainage area with 5000 feet length and 1000 feet height. A Babu and Odeh model was used for the wellbore production prediction, as is known in the art (see Babu, et al., Productivity of a Horizontal Well. *SPE Reservoir Engineering* 4 (4), 1989).

Figure 6A:
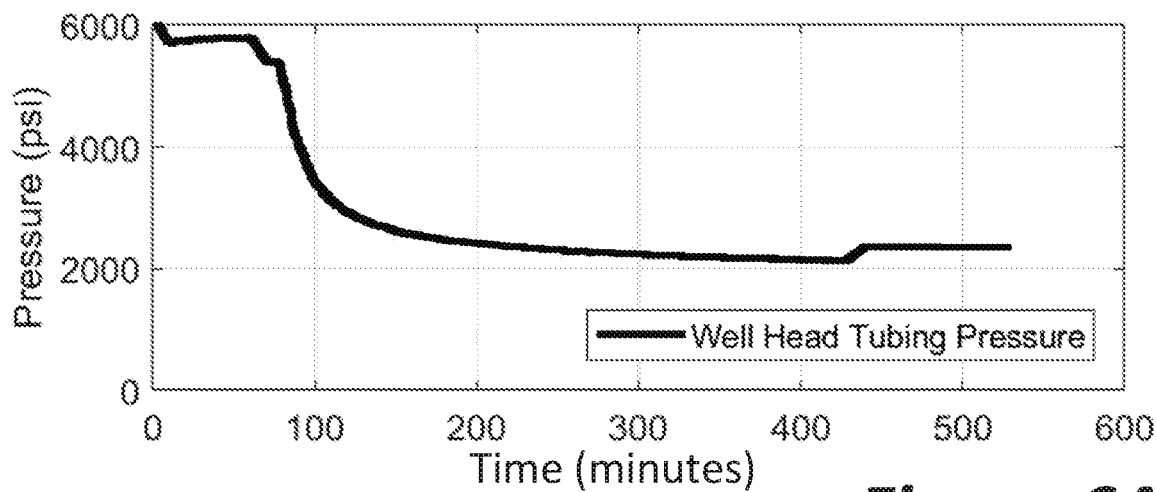
FIGS. 6A, 6B, and 6C show wellhead pressure, wormhole penetration, and wellbore skin, respectively, along a section of a wellbore.
Figure 6B:
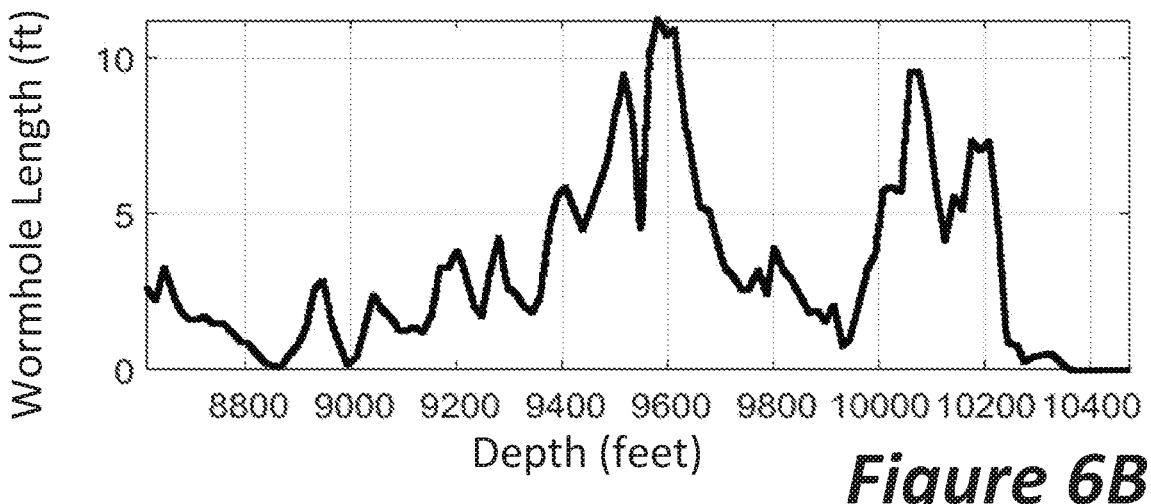
Figure 6C:
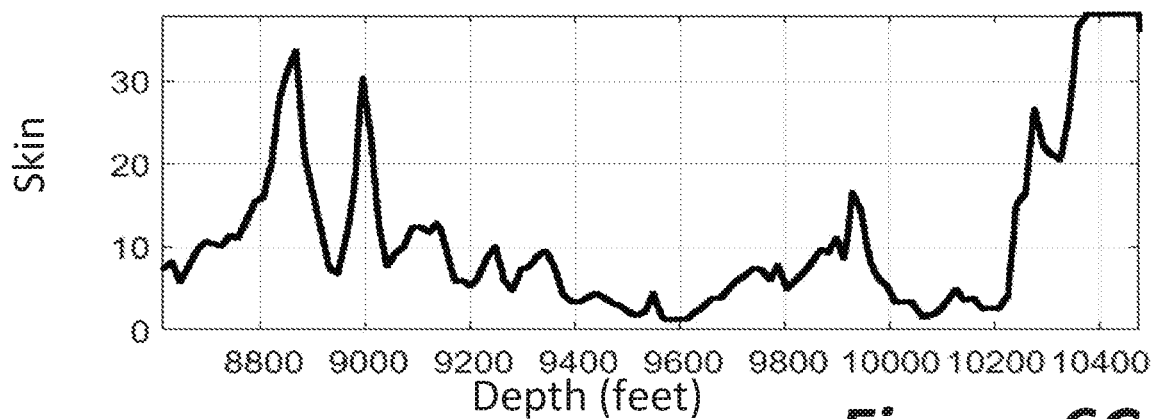

FIGS. 6A, 6B, and 6C show the wellhead pressure, wormhole penetration, and wellbore skin along the wellbore, respectively, as predicted by the wellbore flow model 310. As shown in FIG. 6A, the wellbore pressure has the highest pressure (around 5800 psi) at the beginning of injection. After pre-flush, acid is injected into the wellbore and as soon as acid squeezed into the formation, the overall wellbore injectivity increases and wellhead pressure drops. The wellhead pressure decline rate is very steep at the beginning and then pressure reaches a plateau. This shows the effect of induced wormhole length. At the initial stage of acid reaction with rock, small penetration of wormholes has significant contribution to reduce the skin and enhance flow-capacity. However, as wormhole extended further into the reservoir, its effect diminishes. The behavior of wellhead pressure is a clear signature of the stated physical phenomena.

FIGS. 6B and 6C show the final wormhole length and final skin of the wellbore, respectively. As expected, wormhole penetration follows the permeability and porosity profile. The wormhole penetration along the wellbore varies from 0 feet to 12 feet. In other words, the induced wormhole extends beyond the damage radius (18 inch) at high permeability locations and is shorter than damage radius at other locations. This is a manifestation of over stimulating some parts of the well and under stimulating the other parts. FIG. 6C demonstrates that the skin varies along the wellbore. This is total skin as a result of remaining damage (toward the shoe of the well), wormhole penetration, and perforation skin. On average, the skin of well decreased from 38 to around 15 which is 60% reduction.

The wellbore flow model 310 further predicts different fluid penetration at the end of injection. As with wormhole penetration, the fluid penetration follows the permeability and porosity profile. The wellbore flow model 310 determined that the stimulation fluid could not reach the end of wellbore and hence, limited stimulation was achieved at that location (i.e. skin remains in an average of 38). The wellbore flow model 310 also showed that the penetration of post flush and justifies the large volume that was designed to push most of remaining acid inside wellbore into the reservoir and bypass near wellbore region. As mentioned above, the wellbore flow model 310 provides an injection profile along the wellbore to the rock dissolution model 312. At each time during the stimulation, specific fluid type (i.e. reactive like acid or non-reactive like pre-flush) is injected into the rock. The dynamic effect of different fluid injection into each section of the reservoir is analyzed and porosity enhancement is calculated by using rock dissolution model 312.

The rock dissolution model calculated a change of porosity along the wellbore at the end of stimulation. The porosity was found to be 0 to 0.6, which is the critical porosity of this carbonate rock. As it is expected, wellbore enlargement is significant at higher permeability region. The porosity variation along the wellbore at each radial distance was introduced into the rock mechanical model 314 and the geomechanical model 316 and the geomechanical properties of each section were calculated.

The mechanical model 314 was used to calculate the following mechanical properties along the wellbore: the Young's modulus changes from 0.0 to 7 MMpsi, internal friction angle changes from 0.0 to 45, and pore collapse pressure changes from 0.0 to 50000 psi. This data along with other elastic and failure properties are essential for wellbore stress/failure analysis during production time. The geomechanical data is provided into the three-dimensional wellbore stress analyses and the shear failure and compaction failure of the wellbore at each section and at each production time is assessed. In this case, it is assumed that the wellbore pressure is kept constant at 2000 psi and the stimulation is performed after 9 months of initial production.

The geomechanical model 316 was used to model the status of near wellbore rock at different sections of the wellbore after 18 months of production. At different sections of wellbore different levels of wellbore enlargement occurred. Some sections showed limited wellbore enlargement and also limited rock compaction near the wellbore. In other words, the compaction was not extensive enough to counteract the effect of wormholes. Therefore, that compaction would not negatively impact the production from those sections. On the hand, other sections exhibited extensive wellbore enlargement and rock compaction. At those sections, rock compactions extended beyond the wormhole length and neutralized all or part of the stimulation effect. Note that the limited or extensive failure region at each section is the outcome of acid type and injection volume into different section along the well.

Thus, the geomechanical model 316 showed that by using 15% HCl, considerable compaction on high porosity/permeability areas is induced. Those findings were used by the production prediction engine 318 to show the production prediction before and after the stimulation including the compaction effect at different sections along the wellbore. The results show that the stimulation after 9 months can bring the production rate from 370 bbl/day to around 1000 bbl/day. However, the production rate declines to its original trend just 3 months after the stimulation.

To optimize the acid type, the models were rerun using 10% acetic acid. To achieve the same level of wormhole penetration and skin reduction (to maximize short term production), the volume of acetic acid was increased to 3600 bbl. (1.9 bbl./ft.). The volume of acetic acid was adjusted to give us same wormhole pattern as HCl in order to have equal (if not better) short term initial production. The wellbore flow model and dissolution model showed that the wormhole extension for 10% Acetic acid is slightly shorter than 15% HCl but follows the same pattern and distribution as 15% HCl case. The modeling showed that the porosity improvement of the near-wellbore rock is extended less and therefore weakens the rock less. This is a signature of more competent rock during production that can withstand elevated effective stress during production. Geomechanical modelling proved this behavior. It was shown that none of the previous section of reservoir that demonstrate compaction with HCl stimulation, experienced excessive compaction with acetic acid stimulation. In other words, the modeling predicted that utilizing optimized weaker acid at high temperature conditions could induce an extensive wormhole with minimum weakening of surrounding rock. The production engine predicted a difference between production rate just after stimulation of around 85 bbl/day. This difference in production pays off the surplus charge for 10% Acetic acid in an order of 6 months in addition to minimizing induced geomechanical damage.

The model results show that the overall efficiency of the acid stimulation is primarily a function of the stimulation design parameters (acid type and acid volume) and the geomechanical characteristics of the carbonate rock. It shows that the stimulation effect is stable since excessive weakening increases the rock compaction under near wellbore effective mean stress. At the elevated mean effective stress, the rock failure extended away from near-wellbore region and neutralized the stimulation effects.

While the invention herein disclosed has been described in terms of specific embodiments and applications thereof, numerous modifications and variations could be made thereto by those skilled in the art without departing from the scope of the invention set forth in the claims.

What is claimed is:
1. A method of acidizing a formation traversed by a wellbore, the method comprising:
   determining an optimized acidizing fluid, and
   providing the optimized acidizing fluid to the formation, wherein
   determining the optimized acidizing fluid comprises:
      providing a set of acidizing parameters,
      determining a distribution of reactive and non-reactive fluids along the wellbore during acidizing based on the set of acidizing treatment parameters,
      determining a dissolution of the formation within a region of the wellbore based on the determined distribution of reactive and non-reactive fluids,
      determining one or more mechanical parameters indicative of weakening of the formation within the region of the wellbore based on the determined dissolution,
      predicting damage to the formation due to formation stress during hydrocarbon production based on the determined mechanical parameters,
      predicting an amount of hydrocarbon produced during hydrocarbon production based, at least in part, on the predicted damage, and
      adjusting the set of acidizing parameters to maximize the predicted amount of hydrocarbon produced during hydrocarbon production.
2. The method of claim 1, wherein the set of acidizing parameters comprise one or more parameters selected from the group consisting of an acid strength, an acid concentration, an acid volume, and an acid injection rate.

3. The method of claim 1, wherein determining a distribution of reactive and non-reactive fluids along the wellbore comprises determining a wellbore flow model of the formation based on an initial characterization of the formation and one or more multi-physics or multiscale simulations of the formation.

4. The method of claim 3, wherein the initial characterization of the formation comprises one or more formation parameters selected from the group consisting of a type of hydrocarbon fluid in the formation, a configuration of the wellbore, a static fluid inside the wellbore, a distribution of rock properties along the wellbore, a completion type, and a production enhancement.

5. The method of claim 1, wherein determining a distribution of reactive and non- reactive fluids along the wellbore during the acidizing treatment comprises determining wormhole penetration into the formation.

6. The method of claim 1, wherein determining a dissolution of the formation within a region of the wellbore comprises determining a porosity profile of the formation within the region of the wellbore.

7. The method of claim 1, wherein determining one or more mechanical parameters of the formation comprises determining one or more mechanical parameters selected from the group consisting of Young's modulus, bulk modulus, shear modulus, cohesion, internal friction angle, and pore-collapse pressure.

8. The method of claim 1, wherein predicting damage to the formation during hydrocarbon production comprises determining one or more of shear failure and compressive failure within the formation.

9. The method of claim 8, wherein the one or more of shear failure and compressive failure within the formation is determined based on porosity of the formation.

10. The method of claim 8, wherein predicting damage to the formation during hydrocarbon production comprises determining one or more of shear failure and compressive failure that extends beyond a wormhole penetration radius from the wellbore.

11. A method of optimizing an acidizing treatment of a formation traversed by a wellbore, the method comprising:
for an initial set of acidizing parameters, determining a distribution of reactive fluid along the wellbore,
using a finite element model to determine porosity evolution along the wellbore based on the determined distribution of reactive fluid,
determining one or more mechanical parameters indicative of weakening of the formation based on the determined porosity evolution,
determining a damage radius for formation damage due to formation stress along the wellbore based on the one or more mechanical properties,
predicting an amount of hydrocarbon produced from the formation during hydrocarbon production based on the determined damage radius, and
adjusting the initial set of acidizing parameters to maximize the predicted amount of hydrocarbon produced during hydrocarbon production.

12. The method of claim 11, wherein the mechanical parameters of the formation comprise one or more parameters selected from the group consisting of Young's modulus, bulk modulus, shear modulus, cohesion, internal friction angle, and pore-collapse pressure.

13. The method of claim 11, further comprising determining an extent of wormhole penetration into the wellbore.

14. The method of claim 13, further comprising comparing the extent of wormhole penetration into the wellbore to the determined damage radius along the wellbore.

15. A non-transitory computer readable medium having instructions stored therein, which when executed by a computer cause the computer to perform operations comprising:
for an initial set of acidizing parameters, determining a distribution of reactive fluid along the wellbore,
determining a dissolution of the formation within a region of the wellbore based on the determined distribution of reactive and non-reactive fluids,
determining one or more mechanical parameters indicative of weakening of the formation within the region of the wellbore based on the determined dissolution,
predicting damage to the formation due to formation stress during hydrocarbon production based on the determined mechanical parameters,
predicting an amount of hydrocarbon produced during hydrocarbon production based, at least in part, on the predicted damage, and
adjusting the set of acidizing treatment parameters to maximize the predicted amount of hydrocarbon produced during hydrocarbon production.

16. The non-transitory computer readable medium of claim 15, wherein the initial set of acidizing parameters comprise one or more parameters selected from the group consisting of an acid strength, an acid concentration, an acid volume, and an acid injection rate.

17. The non-transitory computer readable medium of claim 15, wherein determining a distribution of reactive and non-reactive fluids along the wellbore during the acidizing treatment comprises determining wormhole penetration into the formation.

18. The non-transitory computer readable medium of claim 15, wherein determining a dissolution of the formation within a region of the wellbore comprises determining a porosity profile of the formation within the region of the wellbore.

19. The non-transitory computer readable medium of claim 15, wherein determining one or more mechanical parameters of the formation comprises determining one or more mechanical parameters selected from the group consisting of Young's modulus, bulk modulus, shear modulus, cohesion, internal friction angle, and pore-collapse pressure.

20. The non-transitory computer readable medium of claim 15, wherein predicting damage to the formation during hydrocarbon production comprises determining one or more of shear failure and compressive failure that extends beyond a wormhole penetration radius from the wellbore.

* * * * *